United States Patent
Chen et al.

(10) Patent No.: US 9,349,402 B2
(45) Date of Patent: May 24, 2016

(54) APPARATUS INCLUDING TEMPERATURE-DEPENDENT EXCHANGE SPRING MECHANISM

(71) Applicant: SEAGATE TECHNOLOGY LLC, Cupertino, CA (US)

(72) Inventors: Xi Chen, Fremont, CA (US); Ganping Ju, Pleasanton, CA (US); Yingguo Peng, San Ramon, CA (US); Timothy J. Klemmer, Fremont, CA (US); Yukiko Kubota, Campbell, CA (US); Jan-Ulrich Thiele, Sunnyvale, CA (US); David S. Kuo, Palo Alto, CA (US); Kai-Chieh Chang, Pleasanton, CA (US); Kangkang Wang, Fremont, CA (US); Li Gao, San Jose, CA (US); Yinfeng Ding, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/618,992

(22) Filed: Feb. 10, 2015

(65) Prior Publication Data
US 2015/0154995 A1    Jun. 4, 2015

Related U.S. Application Data

(63) Continuation of application No. 14/055,775, filed on Oct. 16, 2013, now Pat. No. 8,988,976.

(60) Provisional application No. 61/844,407, filed on Jul. 9, 2013.

(51) Int. Cl.
| | | |
|---|---|---|
| G11B 11/00 | (2006.01) | |
| G11B 5/66 | (2006.01) | |
| G11B 5/74 | (2006.01) | |
| G11B 5/855 | (2006.01) | |
| G11B 5/84 | (2006.01) | |
| G11B 5/00 | (2006.01) | |

(52) U.S. Cl.
CPC ......... *G11B 5/66* (2013.01); *G11B 5/746* (2013.01); *G11B 5/8404* (2013.01); *G11B 5/855* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,514,161 | B2 * | 4/2009 | Minardi et al. | 428/828 |
| 7,678,476 | B2 | 3/2010 | Weller et al. | |
| 8,460,805 | B1 * | 6/2013 | Gao et al. | 428/828.1 |
| 8,605,555 | B1 * | 12/2013 | Chernyshov et al. | 369/13.33 |
| 8,743,666 | B1 * | 6/2014 | Bertero et al. | 369/13.33 |

(Continued)

FOREIGN PATENT DOCUMENTS

EP    1887568 B1    2/2010

OTHER PUBLICATIONS

International Preliminary Report on Patentability; for PCT Application No. PCT/US2014/045819 issued Jan. 12, 2016, pp. 1-5.

*Primary Examiner* — Tan X Dinh

(57) ABSTRACT

Provided herein is an apparatus comprising a substrate; a continuous layer over the substrate comprising a first heat sink layer; and a plurality of features over the continuous layer comprising a second heat sink layer, a first magnetic layer over the second heat sink layer, and a second magnetic layer, wherein the first and second magnetic layers are configured to provide a temperature-dependent, exchange spring mechanism.

19 Claims, 14 Drawing Sheets

(56) References Cited

U.S. PATENT DOCUMENTS

| | | |
|---|---|---|
| 8,765,273 B1* | 7/2014 | Kubota et al. ............ 428/831.2 |
| 2001/0051287 A1* | 12/2001 | Kikitsu et al. ......... 428/694 ML |
| 2005/0041335 A1 | 2/2005 | Kikitsu et al. |
| 2005/0086679 A1* | 4/2005 | Murakami et al. ............ 720/718 |
| 2005/0157597 A1 | 7/2005 | Sendur et al. |
| 2005/0213436 A1* | 9/2005 | Ono et al. ................. 369/13.02 |
| 2006/0154110 A1* | 7/2006 | Hohlfeld et al. ............. 428/823 |
| 2006/0188752 A1* | 8/2006 | Gusliyenko ................... 428/827 |
| 2007/0172705 A1* | 7/2007 | Weller et al. ................. 428/827 |
| 2008/0144206 A1* | 6/2008 | Mryasov et al. ................. 360/59 |
| 2009/0040644 A1* | 2/2009 | Lu et al. .......................... 360/59 |
| 2010/0182714 A1* | 7/2010 | Kanbe et al. .................... 360/59 |
| 2012/0113768 A1* | 5/2012 | Kanbe et al. ............... 369/13.24 |
| 2012/0251842 A1* | 10/2012 | Yuan et al. ..................... 428/800 |
| 2013/0004796 A1* | 1/2013 | Peng et al. .................... 428/827 |
| 2014/0064047 A1* | 3/2014 | Niwa et al. ................ 369/13.33 |
| 2014/0272473 A1* | 9/2014 | Chen et al. .................. 428/839.6 |
| 2015/0013946 A1* | 1/2015 | Ju et al. .......................... 165/133 |
| 2015/0016774 A1* | 1/2015 | Ju et al. ........................... 385/15 |
| 2015/0017482 A1* | 1/2015 | Lee et al. ................... 428/833.1 |

* cited by examiner

APPARATUS INCLUDING TEMPERATURE-DEPENDENT EXCHANGE SPRING MECHANISM

CROSS-REFERENCE TO RELATED APPLICATIONS

This application is a continuation of U.S. patent application Ser. No. 14/055,775, filed Oct. 16, 2013, now U.S. Pat. No. 8,988,976, and claims the benefit of U.S. Provisional Patent Application No. 61/844,407, filed Jul. 9, 2013, each of which is incorporated herein by reference in its entirety.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope.
General Overview:

It should be noted that the descriptions that follow, for example, in terms of a method for fabricating a patterned composite structure is described for illustrative purposes and the underlying system can apply to any number and multiple types magnetic recording patterns including bit patterned media (BPM) in nano-recording devices. In one embodiment, the method for fabricating a patterned composite structure can be configured using two or more heat sink layers. The method for fabricating a patterned composite structure can be configured to include two or more composite magnetic layers and can be configured to include differing material layers to reduce degrees of temperature rise to perform decoupling.

Figure 1:
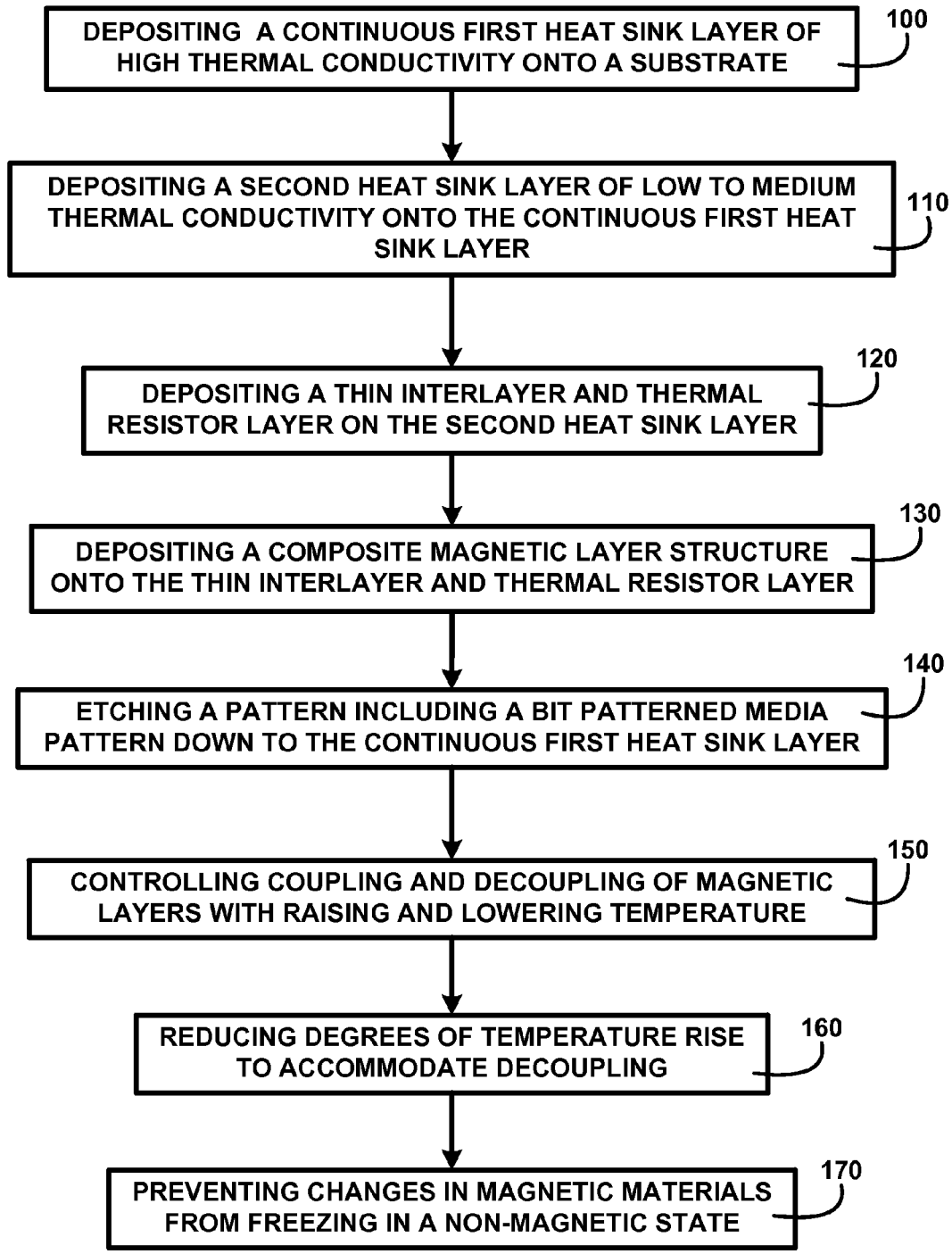
FIG. 1 shows a block diagram of an overview of a method for fabricating a patterned composite structure of one embodiment.

FIG. 1 shows a block diagram of an overview of a method for fabricating a patterned composite structure of one embodiment. FIG. 1 shows depositing a continuous first heat sink layer of high thermal conductivity onto a substrate 100. The processing continues with depositing a second heat sink layer of low to medium thermal conductivity onto the continuous first heat sink layer 110 followed by depositing a thin interlayer and thermal resistor layer on the second heat sink layer 120 of one embodiment.

The fabrication of a HAMR media stack follows with depositing a composite magnetic layer structure onto the thin interlayer and thermal resistor layer 130. Patterning of the HAMR stack is made by etching a pattern including a bit patterned media (BPM) pattern down to the continuous first heat sink layer 140. The patterned composite magnetic layer structure is used for controlling coupling and decoupling of magnetic layers with raising and lowering temperature 150. Raising a temperature above a Curie temperature (Tc) enables coupling of magnetic moments to change magnetization and lowering a temperature below Tc produces decoupling of magnetic moments preventing changes in magnetization. The patterned composite magnetic layer structure combined with the patterned second heat sink layer and continuous first heat sink layer is used for reducing degrees of temperature rise to accommodate decoupling 160 and preventing changes in magnetic materials from freezing in a non-magnetic state 170 of one embodiment.

Figure 2:
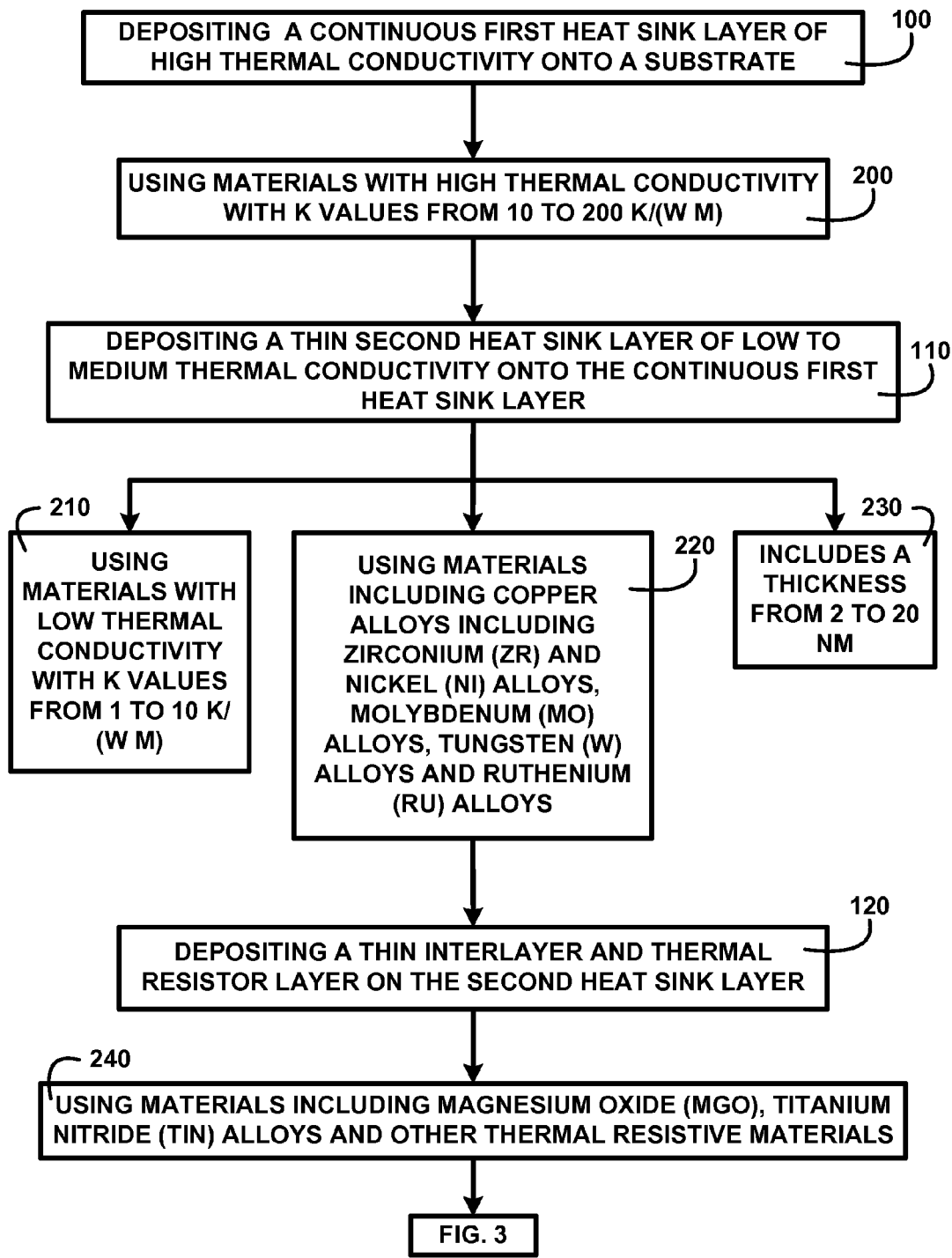
FIG. 2 shows a block diagram of an overview flow chart of a method for fabricating a patterned composite structure of one embodiment.

Detailed Description:

FIG. 2 shows a block diagram of an overview flow chart of a method for fabricating a patterned composite structure of one embodiment. FIG. 2 shows depositing a continuous first heat sink layer of high thermal conductivity onto a substrate 100 using materials with high thermal conductivity with k values from 10 to 200 k/(w m) 200. Depositing a thin second heat sink layer of low to medium thermal conductivity onto the continuous first heat sink layer 110 is made using materials with low thermal conductivity with k values from 1 to 10 k/(w m) 210. The deposition of the thin second heat sink layer is using materials including copper alloys including zirconium (Zr) and nickel (Ni) alloys, molybdenum (Mo) alloys, tungsten (W) alloys and ruthenium (Ru) alloys 220 and includes a thickness from 2 to 20 nm 230. The first heat sink layer of high thermal conductivity and thin second heat sink layer of low to medium thermal conductivity is used to direct heat dissipation away from for example BPM patterned features including a heated island and adjacent non-heated islands of one embodiment.

Depositing a thin interlayer and thermal resistor layer on the second heat sink layer 123 using materials including magnesium oxide (MgO), titanium nitride (TiN) alloys and other thermal resistive materials 240 slow heat losses in the BPM patterned feature being heated during a recording function. Descriptions of continuing processes are shown in FIG. 3 of one embodiment.

Figure 3:
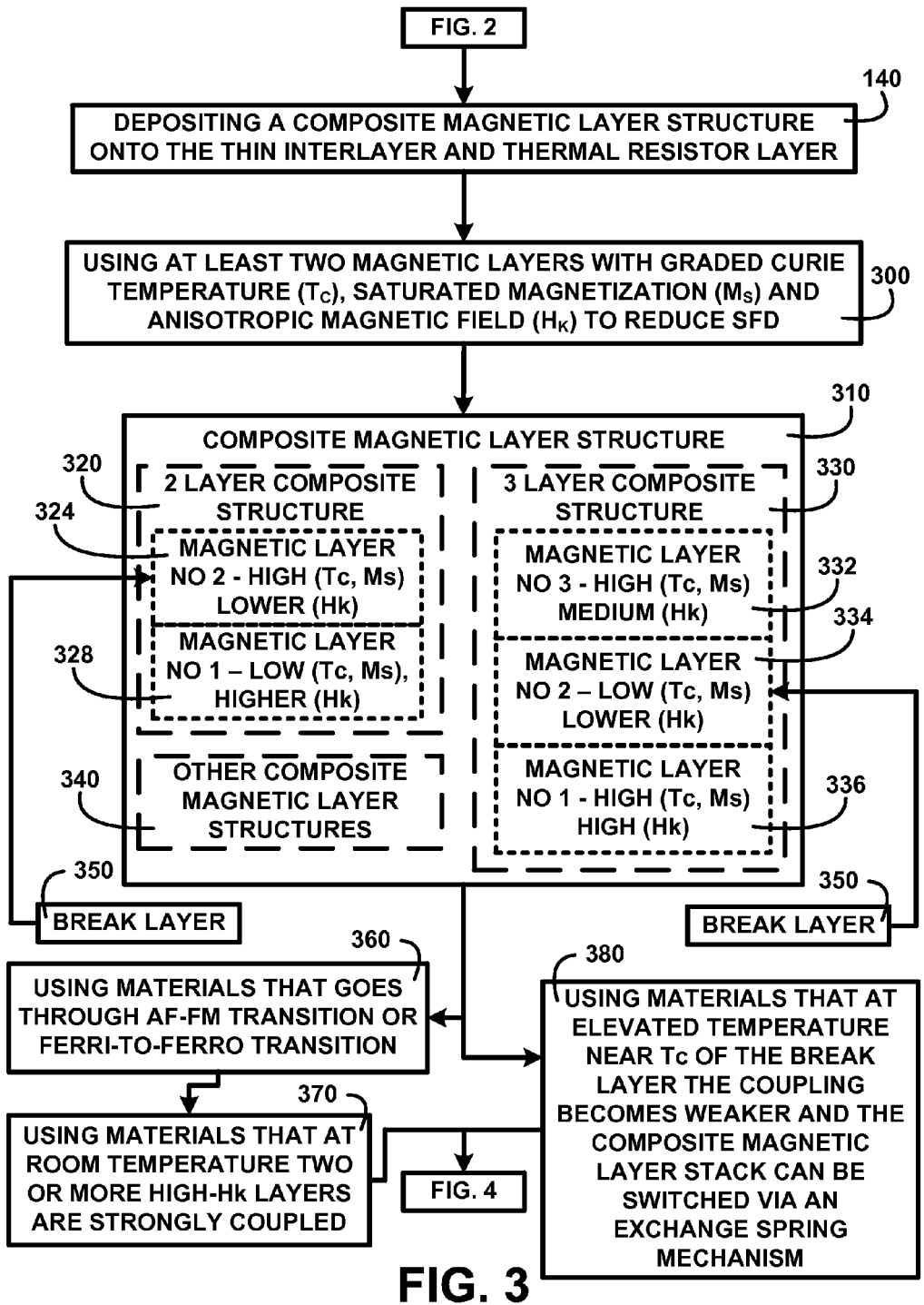
FIG. 3 shows a block diagram of an overview flow chart of composite magnetic layer structure of one embodiment.

FIG. 3 shows a block diagram of an overview flow chart of fabricating a composite magnetic layer structure of one embodiment. FIG. 3 shows continuing from FIG. 2 depositing a composite magnetic layer structure onto the thin interlayer and thermal resistor layer 140. The deposition of the composite magnetic layer structure is using at least two magnetic layers with gradient Curie temperature (Tc), saturated magnetization (Ms) and anisotropic magnetic field (Hk) to reduce SFD 300. A composite magnetic layer structure 310 includes using magnetic materials including iron-platinum (FePt), iron-platinum alloys including FeCuPt, iron-platinum compounds including Fe65Pt and including iron-rhodium (FeRh) including alloys and compounds of one embodiment.

The composite magnetic layer structure 310 can include a 2-layer composite structure 320 with a magnetic layer No. 2—high (Tc, Ms) lower (Hk) 324 which is a break layer 350. The 2-layer composite structure 320 includes a magnetic layer No. 1—low (Tc, Ms), higher (Hk) 328.

The composite magnetic layer structure 310 can include a 3-layer composite structure 330. The 3-layer composite structure 330 includes a magnetic layer No. 3—high (Tc, Ms) medium (Hk) 332 and magnetic layer No. 2—low (Tc, Ms) lower (Hk) 334 which is a break layer 350 and a magnetic layer No. 1—high (Tc, Ms) high (Hk) 336. The composite magnetic layer structure 310 can include other composite magnetic layer structures 340 with more magnetic layers and using other combinations of materials with differing Tc, Ms and Hk properties of one embodiment.

The composite magnetic layer structure 310 can include using materials that goes through AF-FM transition or ferri-to-ferro transition 360. The composite magnetic layer structure 310 can include using materials that at room temperature two or more high-Hk layers are strongly coupled 370. The composite magnetic layer structure 310 can include using materials that at elevated temperature near Tc of the break layer the coupling becomes weaker and the composite magnetic layer stack can be switched via an exchange spring mechanism 380. Processing continuation is described further in FIG. 4 of one embodiment.

Figure 4:
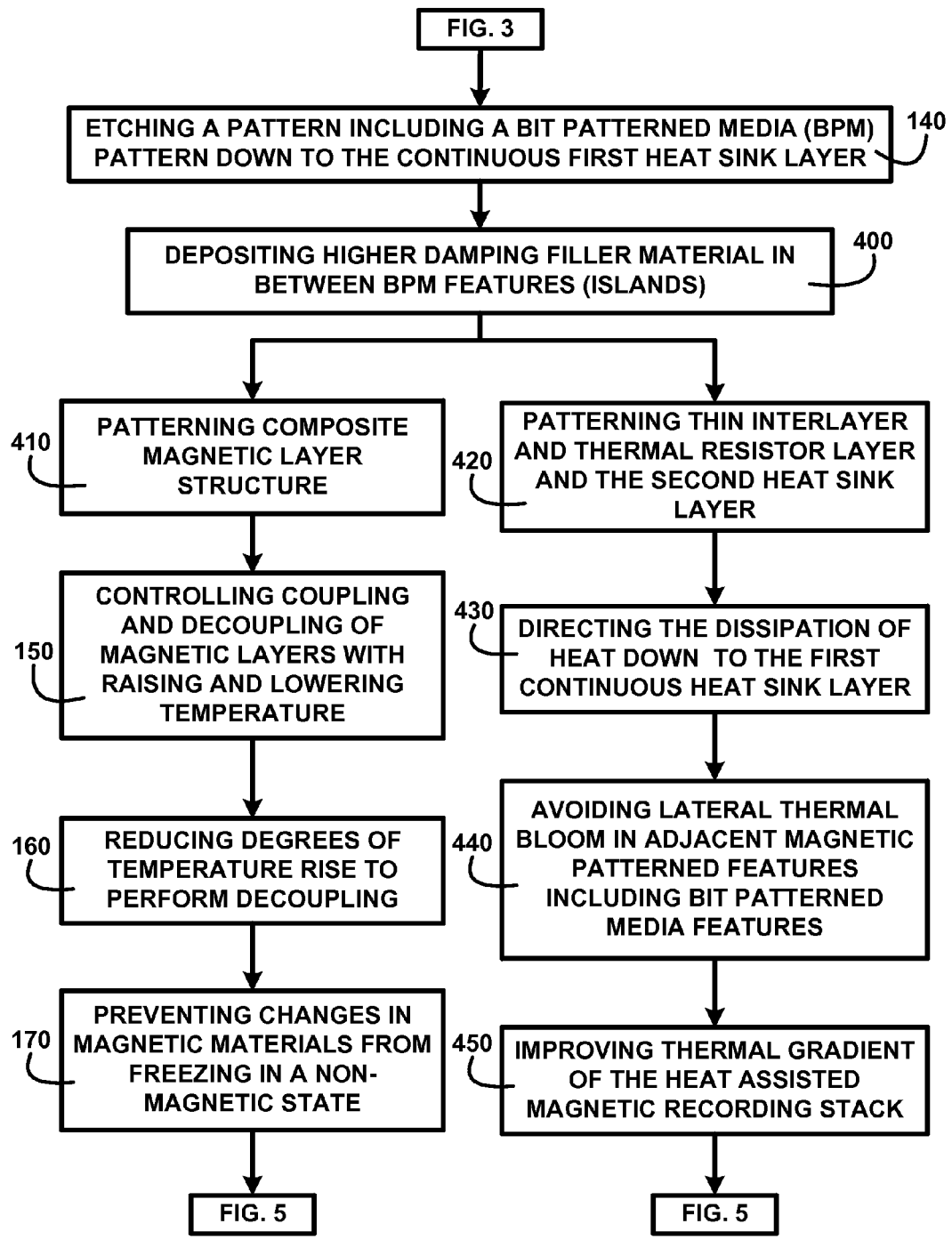
FIG. 4 shows for illustrative purposes only an example of etching a BPM composite magnetic layer structure of one embodiment.

FIG. 4 shows for illustrative purposes only an example of etching a BPM composite magnetic layer structure of one embodiment. FIG. 4 shows a continuation from FIG. 3 including etching a pattern including a bit patterned media (BPM) pattern down to the continuous first heat sink layer 140. Depositing higher damping filler material in between BPM features (islands) 400 can be made after the patterning etch is completed. The etching a pattern including a bit patterned media (BPM) pattern down to the continuous first heat sink layer 140 includes patterning composite magnetic layer structure 410. The patterned composite magnetic layer structure is used for controlling coupling and decoupling of magnetic layers with raising and lowering temperature 150. It is also used in reducing degrees of temperature rise to perform decoupling 160 and preventing changes in magnetic materials from freezing in a non-magnetic state 170. Further uses of the patterned composite magnetic layer structure are described in FIG. 5 of one embodiment.

The etching a pattern including a bit patterned media (BPM) pattern down to the continuous first heat sink layer 140 includes patterning thin interlayer and thermal resistor layer and the second heat sink layer 420. The patterned thin interlayer and thermal resistor layer and the second heat sink layer are used in directing the dissipation of heat down to the first continuous heat sink layer 430. Directing the dissipation of heat down to the first continuous heat sink layer 430 is used for avoiding lateral thermal bloom in adjacent magnetic patterned features including bit patterned media features 440. The avoidance of lateral thermal bloom results in improving thermal gradient of the heat assisted magnetic recording stack 450 of nano-recording devices. The uses of the patterned thin interlayer and thermal resistor layer and the second heat sink layer are further described in FIG. 5 of one embodiment.

Figure 5:
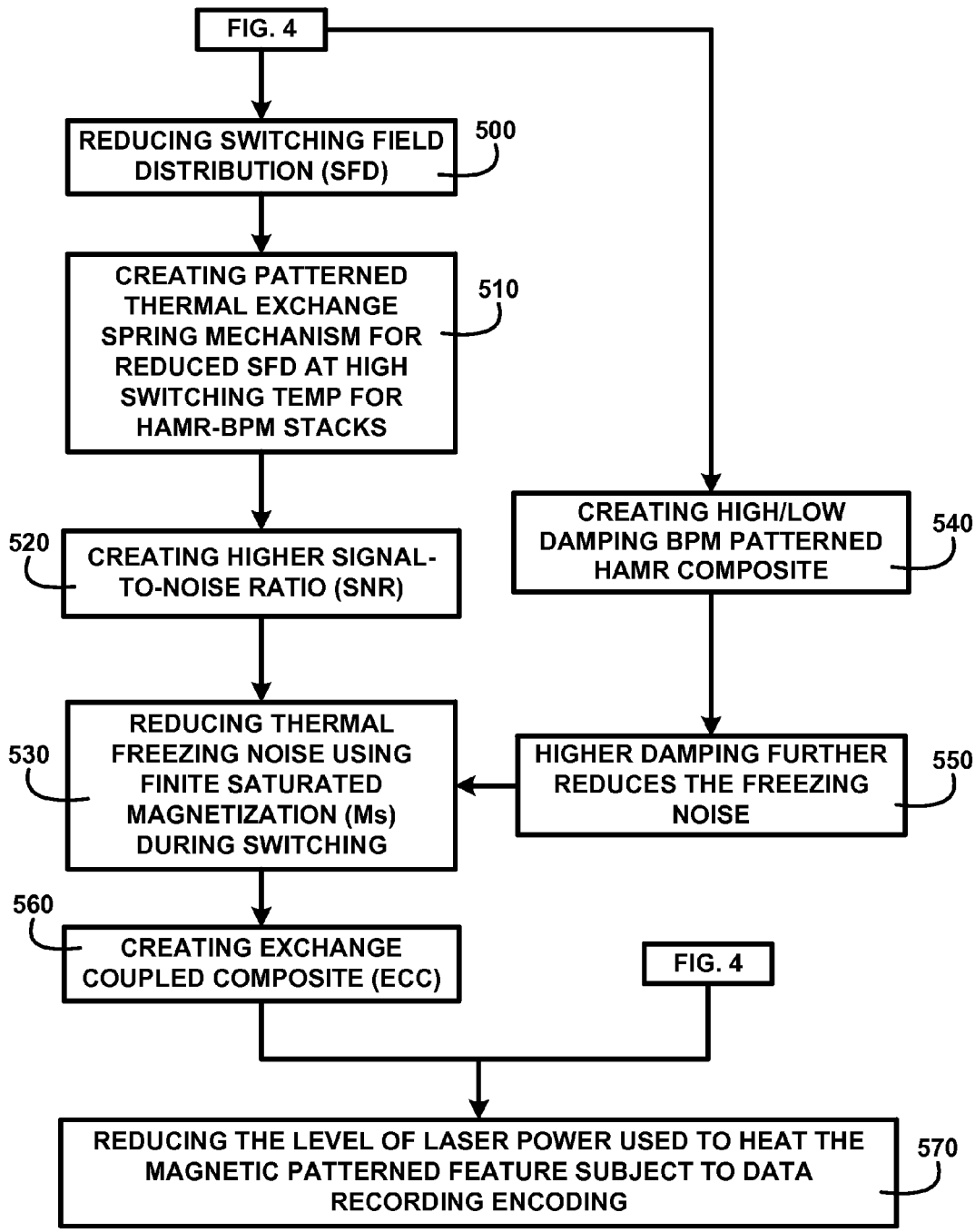
FIG. 5 shows for illustrative purposes only an example of reducing switching field distribution of one embodiment.

FIG. 5 shows for illustrative purposes only an example of reducing switching field distribution of one embodiment. FIG. 5 shows continuing from FIG. 4 the patterned composite magnetic layer structure is used for reducing switching field distribution (SFD) 500. The patterning of the composite magnetic layer structure is creating patterned thermal exchange spring mechanism for reduced SFD at high switching temp for HAMR-BPM stacks 510 and creating higher signal-to-noise ratio (SNR) 520. The patterned composite magnetic layer structure is used in reducing thermal freezing noise using finite saturated magnetization (Ms) during switching 530. The patterned composite magnetic layer structure is creating high/low damping BPM patterned HAMR composite 540 where higher damping further reduces the freezing noise 550. Creating exchange coupled composite (ECC) 560 using the patterned composite magnetic layer structure and the avoidance of lateral thermal bloom using the patterned thin interlayer and thermal resistor layer and the second heat sink layer shown in FIG. 4 combine for reducing the level of laser power used to heat the magnetic patterned feature subject to data recording encoding 570 of one embodiment.

Figure 6:
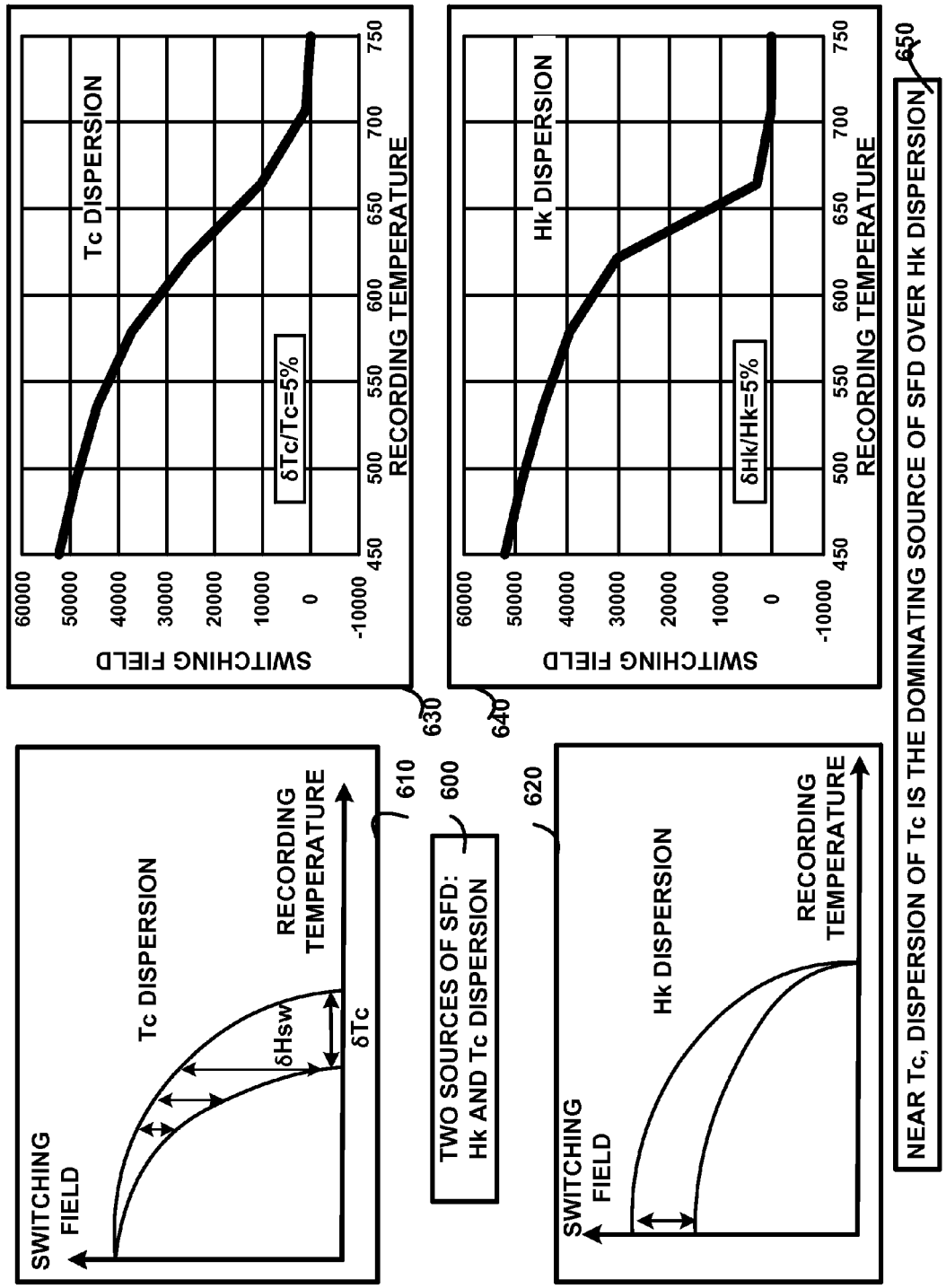
FIG. 6 shows for illustrative purposes only an example of two sources of SFD-Hk and Tc dispersion of one embodiment.

FIG. 6 shows for illustrative purposes only an example of two sources of SFD-Hk and Tc dispersion of one embodiment. FIG. 6 shows two sources of SFD: Hk and Tc dispersion 600. Tc dispersion is illustrated using a first graph of Tc dispersion 610 shows the derivative ranges for anisotropic change ($\delta hsw$) of a switching field vs. derivative changes in Curie temperatures ($\delta Tc$) in recording temperature. A second graph of the Tc dispersion with Hk values of the switching field vs. recording temperature shows the derivative changes divided by the Curie temperature ($\delta Tc/Tc=5\%$) equals 5% 630 of one embodiment.

Hk dispersion is illustrated using a third graph of Hk dispersion 620 shows the ranges for anisotropic change of a switching field vs. changes in Curie temperatures in recording temperature. A fourth graph of the Hk dispersion with Hk values of the switching field vs. recording temperature shows the derivative changes divided by the Hk value of the material ($\delta Hk/Hk=5\%$) equals 5% 640. Near Tc, dispersion of Tc is the dominating source of SFD over Hk dispersion 650 of one embodiment.

Figure 7A:
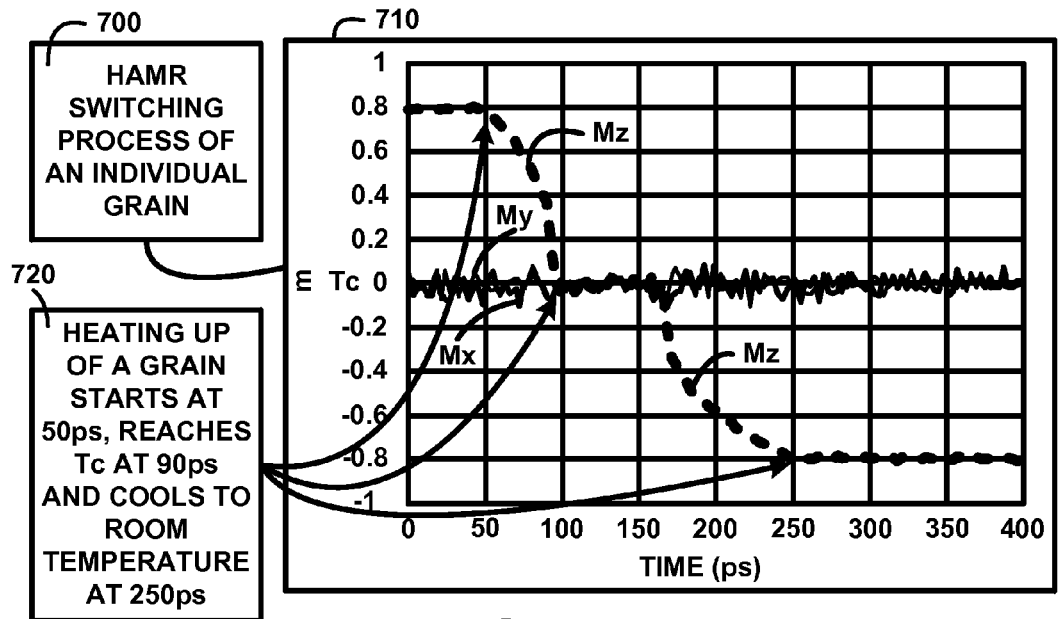
FIG. 7A shows for illustrative purposes only an example of HAMR switching of an individual grain of one embodiment.

FIG. 7A shows for illustrative purposes only an example of HAMR switching of an individual grain of one embodiment. FIG. 7A shows a HAMR switching process of an individual grain 700 illustrated using a graph of $m_z$ vs. TIME (ps) 710. The graph of $m_z$ vs. TIME (ps) 710 shows the heating up of a grain starts at 50 ps, reaches Tc at 90 ps and cools to room temperature at 250 ps 720. The graphs shows the change in magnetization ($m_z$) over the time (ps) in pico seconds (ps) of the grain heat up period and the cooling period down to the Curie temperature of one embodiment.

Figure 7B:
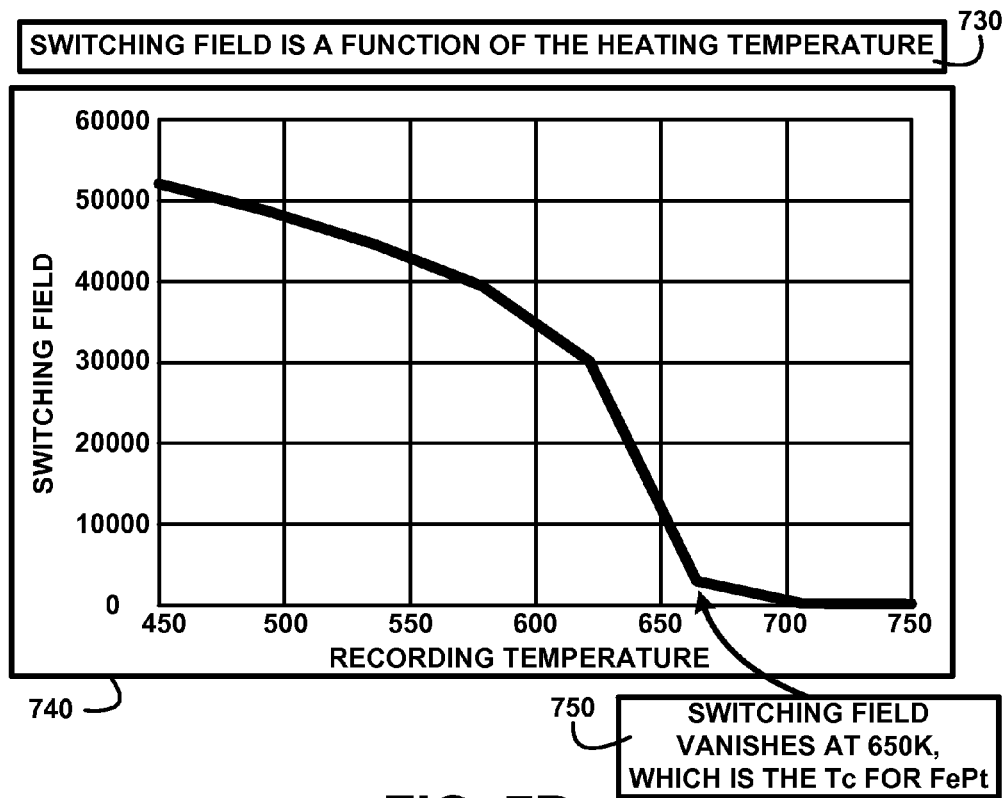
FIG. 7B shows for illustrative purposes only an example of switching field function of heating temperature of one embodiment.

FIG. 7B shows a switching field is a function of the heating temperature 730 using a graph of switching field Hex values in Oe vs. recording temperature 740. The graph illustrates that a switching field vanishes at 650 k, which is the Tc for FePt 750 of one embodiment.

Figure 8:
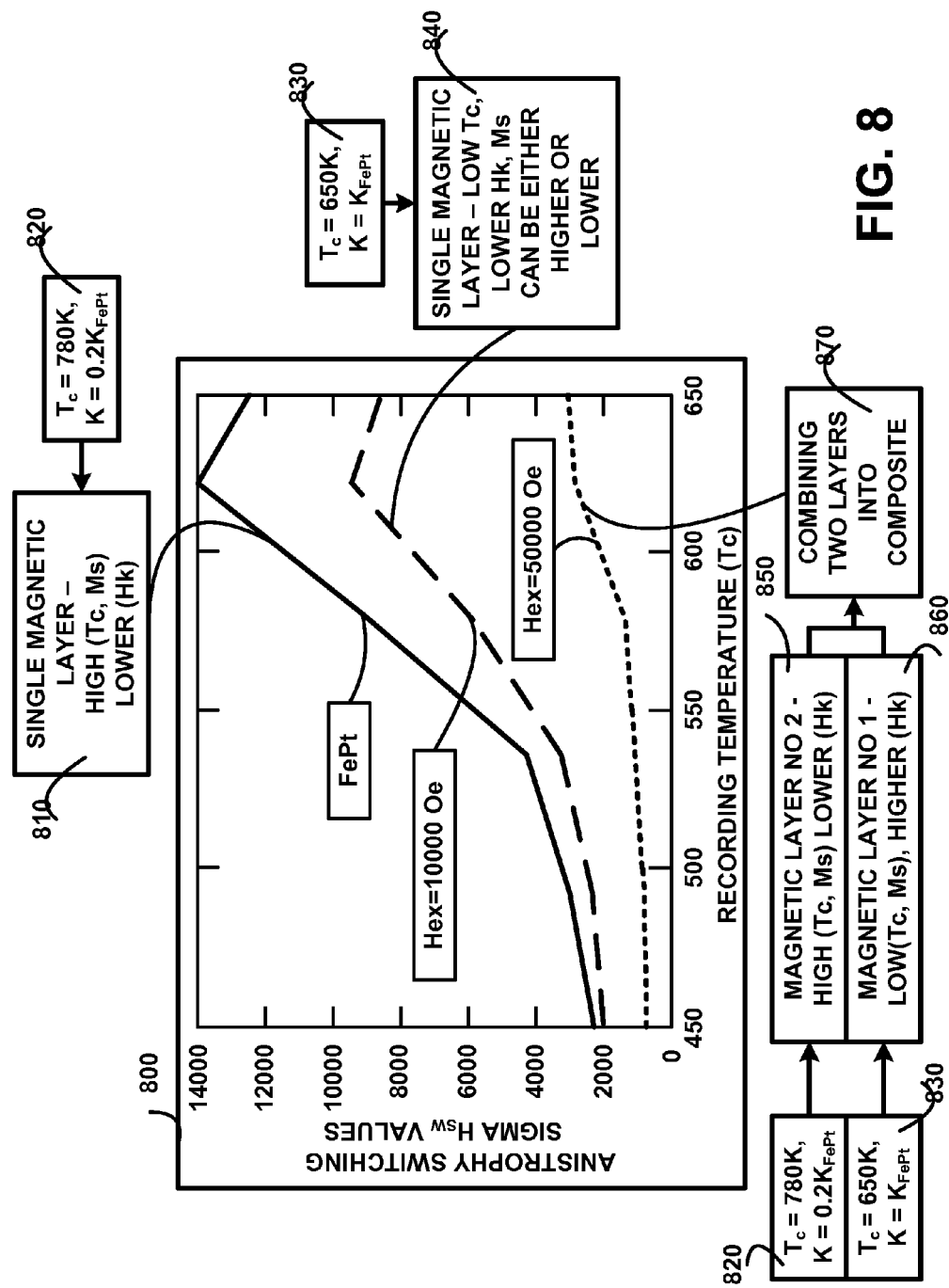
FIG. 8 shows for illustrative purposes only an example of anisotropy switching vs. recording temperature of one embodiment.

FIG. 8 shows for illustrative purposes only an example of anisotropy switching vs. recording temperature of one embodiment. FIG. 8 shows a graph of anisotropy switching sigma hsw values vs. recording temperature Tc 800. Shown is a first single magnetic layer No. 2—high (Tc, Ms) lower (Hk) 810 with for example Tc =780 k, k=0.2 k FePt 820. A second single magnetic layer—low Tc, lower Hk, Ms can be either higher or lower 840 with for example Tc=650 k, k=k FePt 830 and Hex=10000 Oe shows lower switching values than magnetic layer No. 2.

Combining two layers into composite 870 structure using magnetic layer No. 2—high (Tc, Ms) lower (Hk) 850 with Tc=780 k, k=0.2 k FePt 820 and magnetic layer No. 1—low (Tc, Ms), higher (Hk) 860 with Tc=650 k, k=k FePt 830 with Hex=50000 Oe results in lower switching values than either single magnetic layer of one embodiment.

Figure 9:
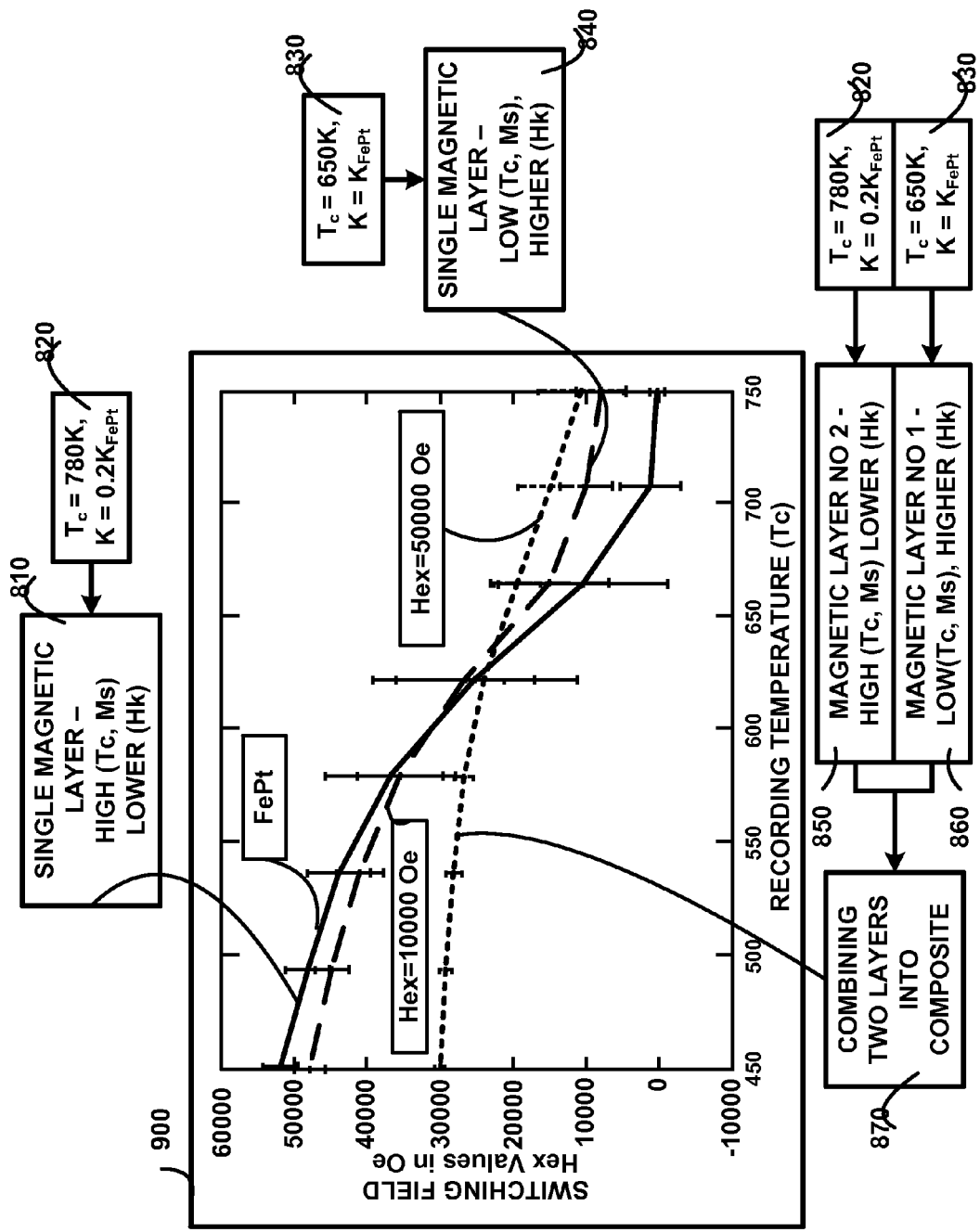
FIG. 9 shows for illustrative purposes only an example of switching field vs. recording temperature of one embodiment.

FIG. 9 shows for illustrative purposes only an example of switching field vs. recording temperature of one embodiment. FIG. 9 shows a graph of switching field Hex values vs. recording temperature Tc 900. The range of Hex values at various recording temperature points are averaged to create a trend line. The single magnetic layer No. 2—high (Tc, Ms) lower (Hk) 810 with for example Tc=780 k, k=0.2 k FePt 820 shows a greater distribution from starting high Hex values to ending Hex values than that of the single magnetic layer No. 1—low (Tc, Ms), higher (Hk) 840 with for example Tc=650 k, k=kFePt 830 and Hex=10000 Oe.

A magnetic layer combining two layers into composite 870 structure using magnetic layer No. 2—high (Tc, Ms) lower (Hk) 850 and magnetic layer No. 1—low (Tc, Ms), higher (Hk) 860 with Hex=50000 Oe results in the least distribution from starting high Hex values to ending Hex values than either of the single magnetic layers alone of one embodiment.

Figure 10:
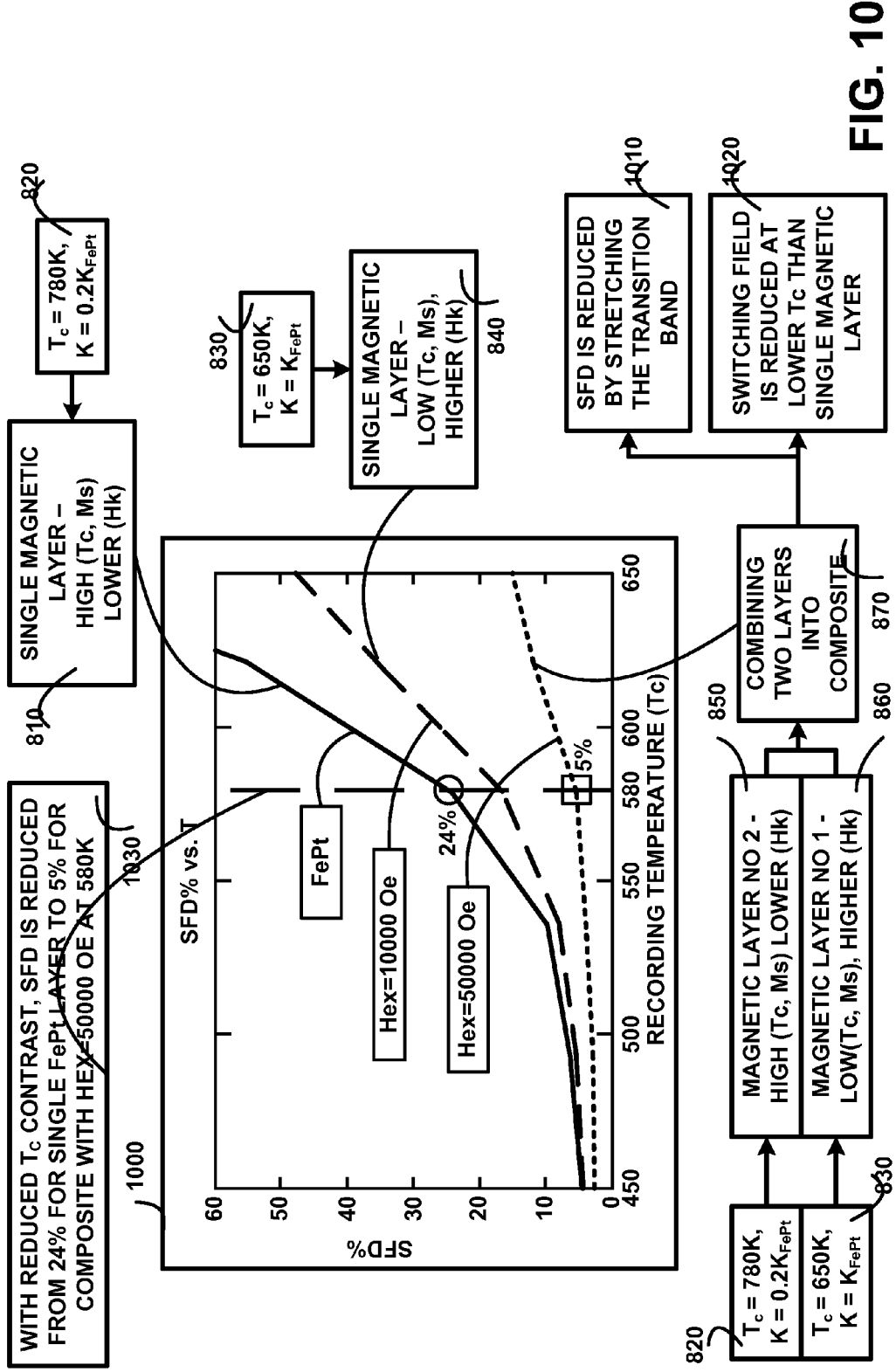
FIG. 10 shows for illustrative purposes only an example of combining two layers into a composite structure of one embodiment.

FIG. 10 shows for illustrative purposes only an example of combining two layers into composite of one embodiment. FIG. 10 shows a graph of SFD % vs. T 1000 where T=recording temperature. The SFD % results are highest for the single magnetic layer No. 2—high (Tc, Ms) lower (Hk) 810 with for example Tc=780 k, k=0.2 k FePt 820. The SFD % results for the single magnetic layer No. 1—low (Tc, Ms), higher (Hk) 840 with for example Tc=650 k, k=kFePt 830 and Hex=10000 Oe are lower than those of the single magnetic layer No. 2.

Combining two layers into composite 870 using magnetic layer No. 2—high (Tc, Ms) lower (Hk) 850 and magnetic layer No. 1—low (Tc, Ms), higher (Hk) 860 with Hex=50000 Oe shows SFD % results lower than either single magnetic layer. SFD is reduced by stretching the transition band 1010 and switching field is reduced at lower Tc than single magnetic layer 1020. Combining two layers into composite 870 produces results with reduced Tc contrast, SFD is reduced from 24% for single FePt layer to 5% for composite with Hex=50000 Oe at 580 k 1030 of one embodiment.

Figure 11:
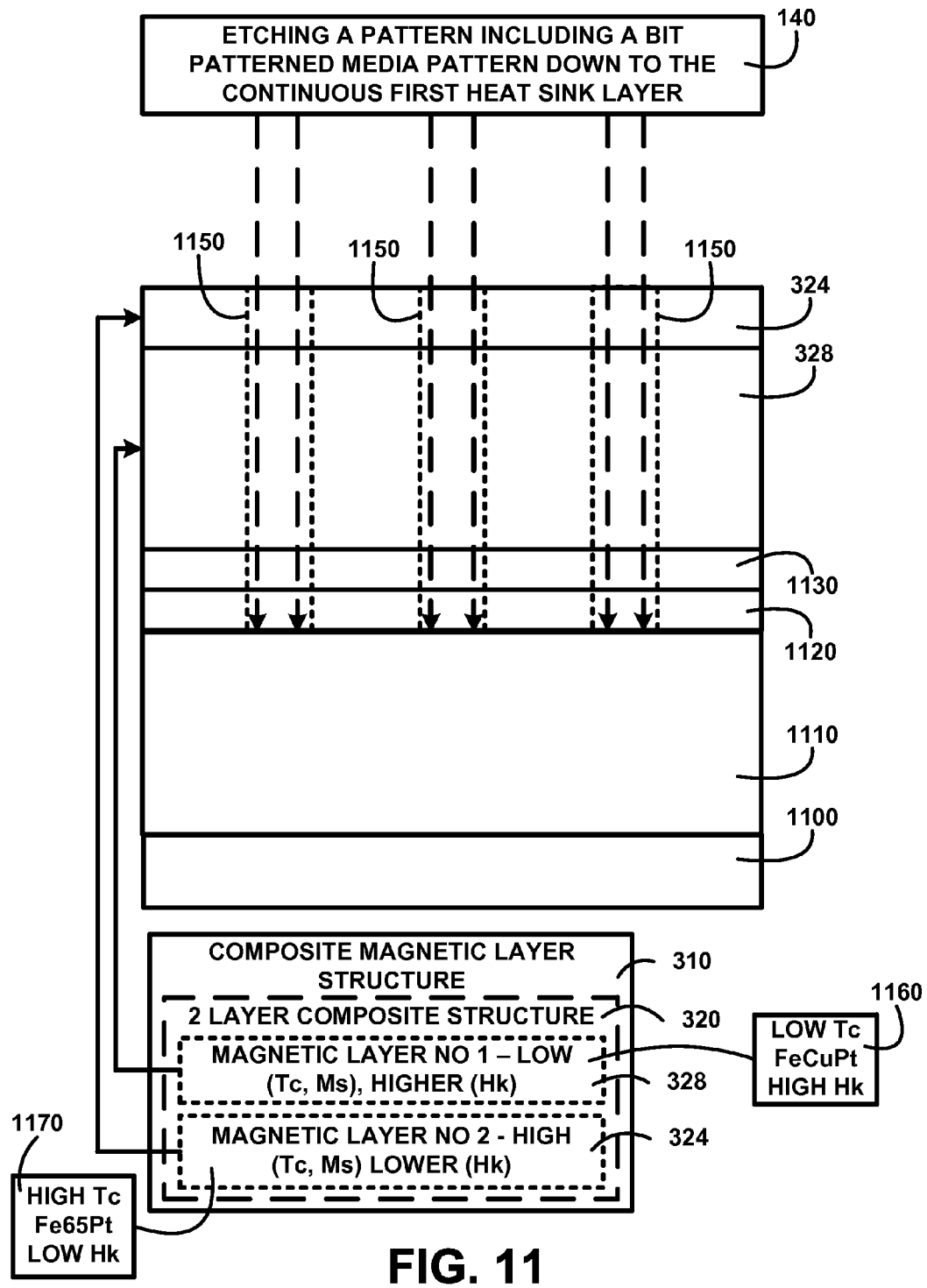
FIG. 11 shows for illustrative purposes only an example of 2-layer composite structure of one embodiment.

FIG. 11 shows for illustrative purposes only an example of 2-layer composite structure of one embodiment. FIG. 11 shows a substrate 1100 with a continuous first heat sink layer of high thermal conductivity 1110 deposited thereon. A second heat sink layer of low to medium thermal conductivity 1120 deposited on the continuous first heat sink layer of high thermal conductivity 1110. A thin interlayer and thermal resistor layer 1130 is deposited onto the second heat sink layer of low to medium thermal conductivity 1120 of one embodiment.

A deposition using for example low Tc FeCuPt high Hk 1160 deposits the magnetic layer No. 1—low (Tc, Ms), higher (Hk) 328 onto the thin interlayer and thermal resistor layer 1130. A deposition using for example high Tc Fe65Pt low Hk 1170 to deposit the magnetic layer No. 2—high (Tc, Ms) lower (Hk) 324 to create the 2-layer composite structure 320 of a composite magnetic layer structure 310. A patterning process is used to transfer a bit pattern media feature (island) pattern 1150. The patterning process includes etching a pattern including a bit patterned media pattern down to the continuous first heat sink layer 140 of one embodiment.

Figure 12:
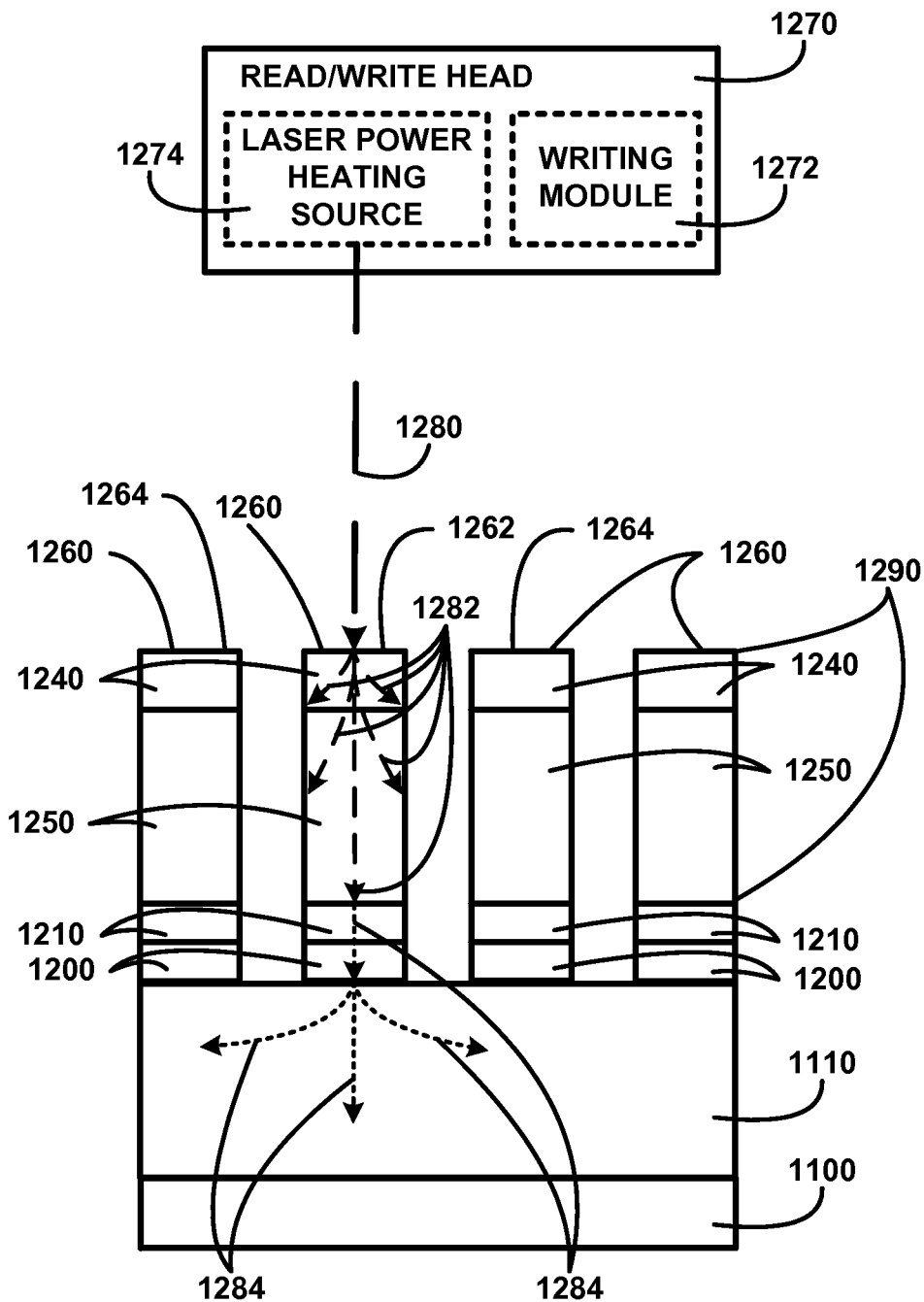
FIG. 12 shows for illustrative purposes only an example of patterned 2-layer composite magnetic layer structure of one embodiment.

FIG. 12 shows for illustrative purposes only an example of patterned 2-layer composite magnetic layer structure of one embodiment. FIG. 12 shows the substrate 1100 and continuous first heat sink layer of high thermal conductivity 1110. A patterned BPM feature (island) 1260 includes a patterned second heat sink layer of low to medium thermal conductivity 1200 and patterned thin interlayer and thermal resistor layer 1210. A patterned 2-layer composite magnetic layer structure 1290 includes a patterned magnetic layer No. 1—low (Tc, Ms), higher (Hk) 1250 and a patterned magnetic layer No. 2—high (Tc, Ms) lower (Hk) 1240 of one embodiment.

A read/write head 1270 includes a writing module 1272 used to encode data in the patterned BPM feature (island) 1260 when heated. The read/write head 1270 can include for example a laser power heating source 1274. The laser power heating source 1274 is used to heat the patterned 2-layer composite magnetic layer structure 1290. The laser power heating source 1274 applies heat optically to a targeted patterned BPM feature (island) 1262. Applied optical heat 1280 is spread throughout the magnetic materials as conducted heat 1282. The patterned thin interlayer and thermal resistor layer 1210 is an insulating material that slows the dissipation of heat from the magnetic materials enabling the magnetic materials to rise in temperature quickly. As shown in FIG. 7A the rise in temperature takes place in pico seconds (ps) of one embodiment.

When the targeted patterned BPM feature (island) 1262 reaches a temperature at or above the Curie temperature (Tc) the laser power heating source 1274 power is cut and the application of heat is stopped. The writing module 1272 applies a current with a polarity to encode the data bit to the targeted patterned BPM feature (island) 1262. When heat dissipation 1284 reduces the temperature below Tc the polarity of the patterned 2-layer composite magnetic layer structure 1290 is oriented to the same polarity as the encoding writing module 1272 current of one embodiment.

The heat dissipation 1284 is directed from the magnetic materials down through the patterned thin interlayer and thermal resistor layer 1210 to the patterned second heat sink layer of low to medium thermal conductivity 1200. The heat dissipation 1284 is directed from the patterned second heat sink layer of low to medium thermal conductivity 1200 to the continuous first heat sink layer of high thermal conductivity 1110. The direction of heat dissipation 1284 is enabled as the thermal transfer follows a path from low to medium thermal conductivity to high thermal conductivity. The patterned thin interlayer and thermal resistor layer 1210, patterned second heat sink layer of low to medium thermal conductivity 1200 and continuous first heat sink layer of high thermal conductivity 1110 creates a graded heat dissipation thermal conductivity structure of one embodiment.

The mass of the continuous first heat sink layer of high thermal conductivity 1110 absorbs the heat applied to the patterned 2-layer composite magnetic layer structure 1290. The patterning of the thin interlayer and thermal resistor layer and second heat sink layer removes the mass of the materials that extend laterally along the layer. The patterning isolates the heat dissipation 1284 to the patterned features of the targeted patterned BPM feature (island) 1262 and avoids transfers of the heat to adjacent patterned BPM feature (island) 1264. The transfer of heat to adjacent patterned BPM feature (island) 1264 is referred to a lateral thermal bloom. Without patterning the thin interlayer and thermal resistor layer and second heat sink layer the heat can be dissipated laterally along the continuous layer of the materials and pass to the adjacent patterned BPM feature (island) 1264. Avoiding lateral thermal bloom in adjacent magnetic patterned features including bit patterned media features 440 of FIG. 4 enables improving thermal gradient of the heat assisted magnetic recording stack 450 of FIG. 4 of one embodiment.

Lateral thermal bloom dissipates a greater amount of heat from the targeted patterned BPM feature (island) 1262 thereby increasing the amount of applied optical heat 1280 to raise the temperature of the magnetic materials. Avoiding Lateral thermal bloom and using the patterned 2-layer composite magnetic layer structure 1290 reducing degrees of temperature rise to perform decoupling 160 creates an overall reduction in the amount of power used by the laser power heating source 1274 of one embodiment.

Figure 13:
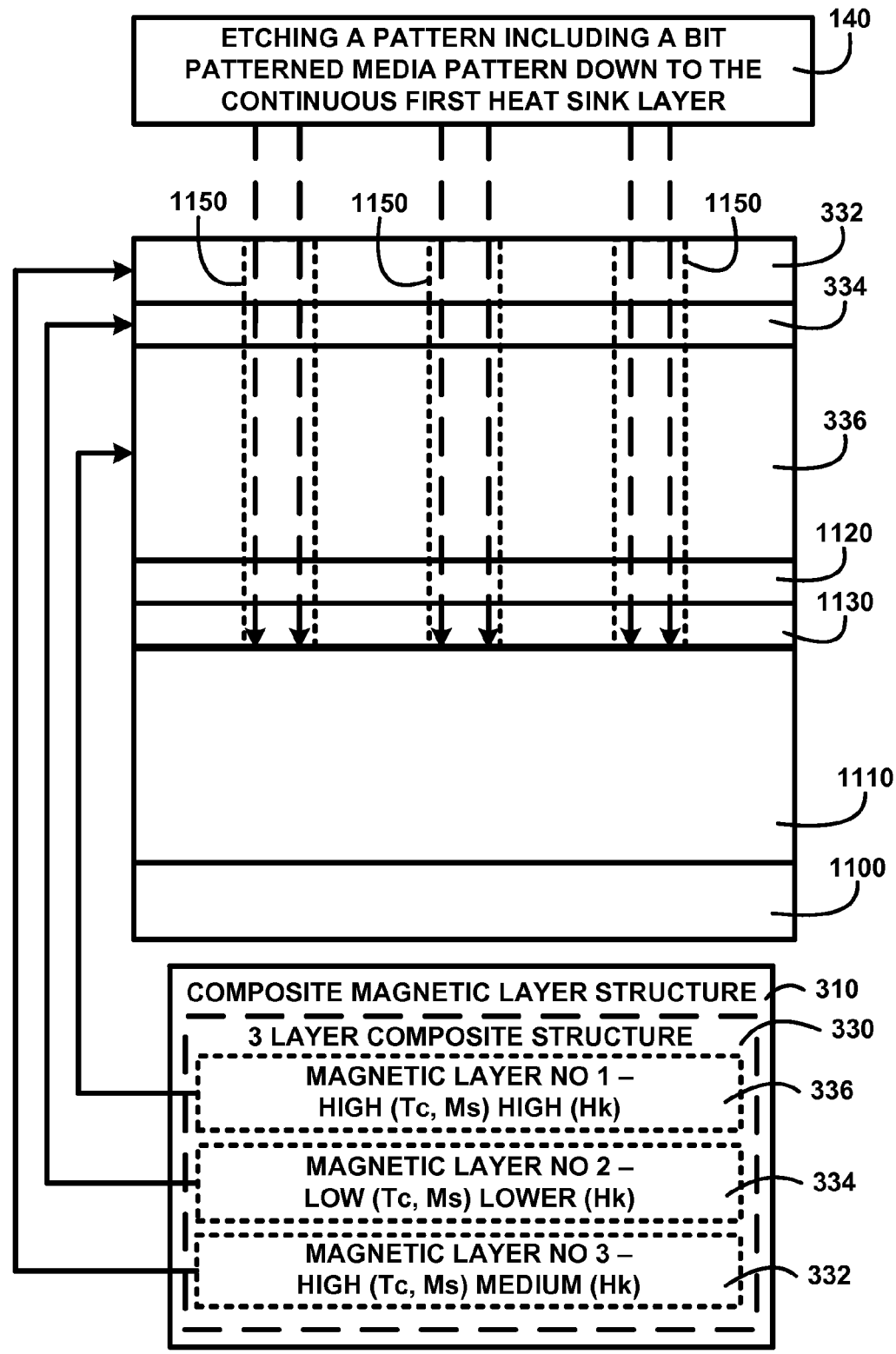
FIG. 13 shows for illustrative purposes only an example of 3-layer composite structure of one embodiment.

FIG. 13 shows for illustrative purposes only an example of 3-layer composite structure of one embodiment. FIG. 13 shows the substrate 1100, continuous first heat sink layer of high thermal conductivity 1110, second heat sink layer of low to medium thermal conductivity 1130 and thin interlayer and thermal resistor layer 1120. The composite magnetic layer structure 310 includes the deposition of the S-layer composite structure 330 including the magnetic layer No. 1—high (Tc, Ms) high (Hk) 336, magnetic layer No. 2—low (Tc, Ms) lower (Hk) 334 and magnetic layer No. 3—high (Tc, Ms) medium (Hk) 332. The 3-layer composite structure 330 of the composite magnetic layer structure 310 is patterned using the bit pattern media feature (island) pattern 1150. The HAMR stack is patterned by etching a pattern including a bit patterned media pattern down to the continuous first heat sink layer 140 of one embodiment.

Figure 14:
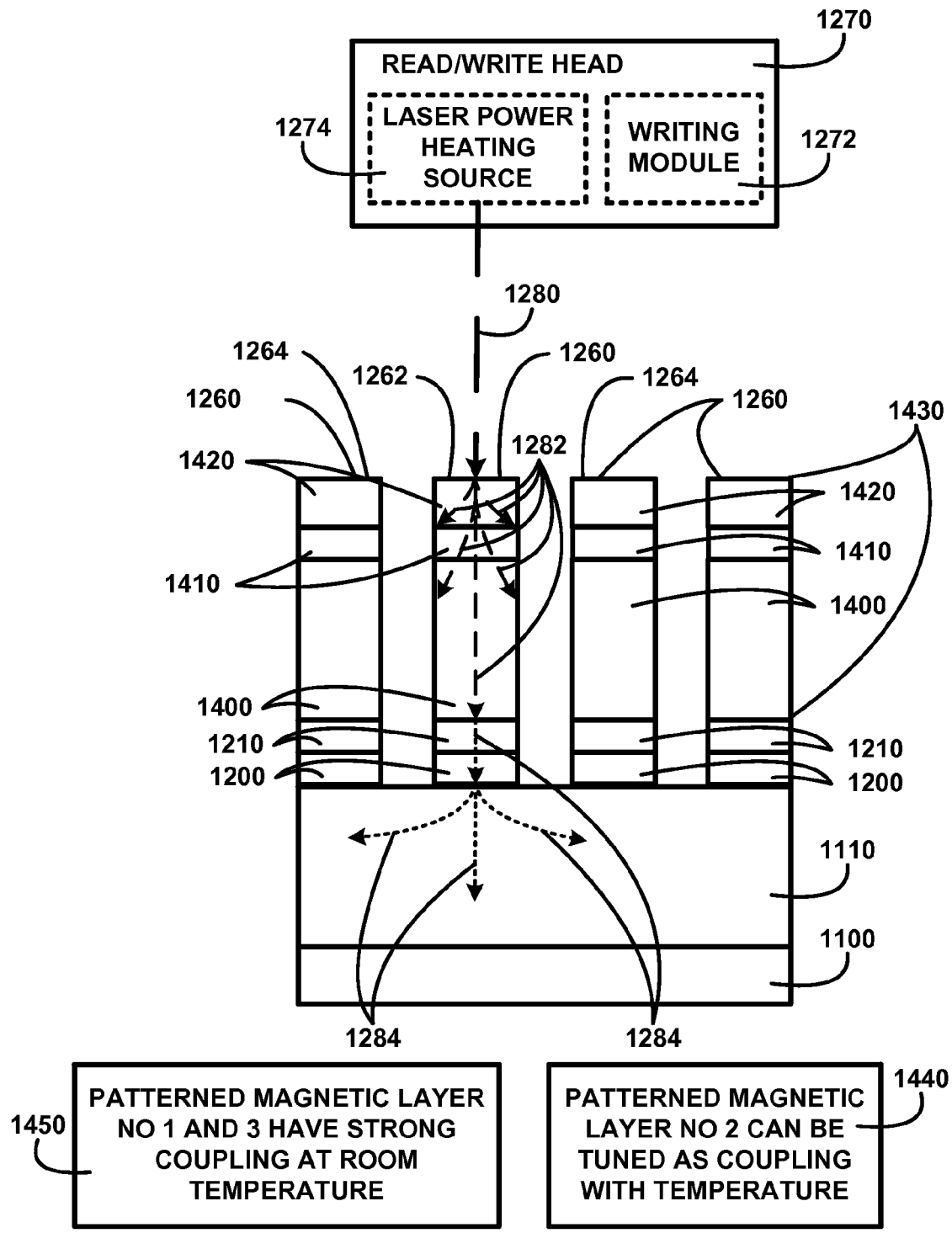
FIG. 14 shows for illustrative purposes only an example of patterned 3-layer composite magnetic layer structure of one embodiment.

FIG. 14 shows for illustrative purposes only an example of patterned 3-layer composite magnetic layer structure of one embodiment. FIG. 14 shows the substrate 1100 and continuous first heat sink layer of high thermal conductivity 1110. The process of etching a pattern including a bit patterned media pattern down to the continuous first heat sink layer 140 creates a BPM patterned HAMR stack including the patterned second heat sink layer of low to medium thermal conductivity 1200 and patterned thin interlayer and thermal resistor layer 1210. The patterned BPM feature (island) 1260 further includes a patterned magnetic layer No. 1—high (Tc, Ms) high (Hk) 1400, patterned magnetic layer No. 2—low (Tc, Ms) lower (Hk) 1410 and patterned magnetic layer No. 3—high (Tc, Ms) medium (Hk) 1420 to create a patterned 3-layer composite magnetic layer structure 1430 of one embodiment.

The read/write head 1270 includes the writing module 1272 and laser power heating source 1274. The laser power heating source 1274 is used to provide applied optical heat 1280 to the targeted patterned BPM feature (island) 1262 including the patterned 3-layer composite magnetic layer structure 1430. The applied optical heat 1280 transfers heat throughout the patterned 3-layer composite magnetic layer structure 1430 as conducted heat 1282. When the patterned 3-layer composite magnetic layer structure 1430 reaches a temperature at or above the Curie temperature (Tc) the laser power heating source 1274 application of heat is stopped of one embodiment.

The writing module 1272 applies a current with a polarity to encode the data bit to the targeted patterned BPM feature (island) 1262. Heat dissipation 1284 reduces the temperature below Tc and the polarity of the patterned 3-layer composite magnetic layer structure 1430 is oriented to the same polarity as the encoding writing module 1272 current. The patterned magnetic layer No. 2 can be tuned as coupling with temperature 1440. The patterned magnetic layer No. 1 and 3 have strong coupling at room temperature 1450 of one embodiment.

The patterned second heat sink layer of low to medium thermal conductivity 1200 and patterned thin interlayer and thermal resistor layer 1210 are used for directing heat dissipation 1284 while avoiding lateral thermal bloom in adjacent magnetic patterned features including bit patterned media features 440 of FIG. 4. The HAMR stack including the patterned 3-layer composite magnetic layer structure 1430 included in the patterned BPM feature (island) 1260 uses the composite magnetic layer structures for controlling coupling and decoupling of magnetic layers with raising and lowering temperature 150 of FIG. 1, reducing degrees of temperature rise to accommodate decoupling 160 of FIG. 1 and preventing changes in magnetic materials from freezing in a non-magnetic state 170 of FIG. 1 of one embodiment.

The foregoing has described the principles, embodiments and modes of operation. However, the invention should not be construed as being limited to the particular embodiments discussed. The above described embodiments should be regarded as illustrative rather than restrictive, and it should be appreciated that variations may be made in those embodiments by workers skilled in the art without departing from the scope as defined by the following claims.

What is claimed is:

1. An apparatus comprising
a substrate;
a continuous layer over the substrate comprising
a continuous first heat sink layer; and
a plurality of patterned features over the continuous layer,
wherein each of the patterned features includes
a patterned second heat sink layer,
a patterned first magnetic layer overlying the patterned second heat sink layer, and
a patterned second magnetic layer,
wherein the patterned first and second magnetic layers are configured to provide a temperature-dependent, exchange spring mechanism.

2. The apparatus of claim 1,
wherein the exchange spring mechanism is effected by the patterned first and second magnetic layers being more strongly coupled at a first temperature than at a second, higher temperature.

3. The apparatus of claim 2,
wherein the second, higher temperature facilitates a magnetization change in one or more of the plurality of patterned features by a read/write head.

4. The apparatus of claim 1,
wherein the continuous first heat sink layer has a higher thermal conductivity than the patterned second heat sink layer.

5. The apparatus of claim 1,
wherein the patterned first magnetic layer has a higher anisotropy field $H_k$ than the patterned second magnetic layer.

6. The apparatus of claim 1,
wherein the patterned first magnetic layer has a lower saturation magnetization $M_s$ than the patterned second magnetic layer.

7. The apparatus of claim 1,
wherein the patterned first magnetic layer has a lower Curie temperature $T_c$ than the patterned second magnetic layer.

8. An apparatus comprising
a patterned layer over a continuous first heat sink layer, wherein the patterned layer includes a patterned island comprising
a patterned second heat sink layer, a patterned first magnetic layer overlying the patterned second heat sink layer, and a patterned second magnetic layer, wherein the patterned first and second magnetic layers are configured to provide a temperature-dependent, exchange spring mechanism.

9. The apparatus of claim 8, wherein the exchange spring mechanism is effected by the patterned first and second magnetic layers being more weakly coupled at a first temperature than at a second, lower temperature.

10. The apparatus of claim 8, wherein the continuous first heat sink layer has a higher thermal conductivity than the patterned second heat sink layer.

11. The apparatus of claim 10, wherein the patterned first magnetic layer has a higher anisotropy field $H_k$ than the patterned second magnetic layer.

12. The apparatus of claim 10, wherein the patterned first magnetic layer has a lower saturation magnetization $M_s$ than the patterned second magnetic layer.

13. The apparatus of claim 10, wherein the patterned first magnetic layer has a lower Curie temperature $T_c$ than the patterned second magnetic layer.

14. The apparatus of claim 8, further comprising a thermal resistor layer in-between the patterned second heat sink layer and the patterned first magnetic layer.

15. An apparatus comprising a plurality of patterned features comprising a patterned first magnetic layer, a patterned second magnetic layer overlying the patterned first magnetic layer, and a patterned third magnetic layer over the patterned second magnetic layer, wherein the patterned first, second, and third magnetic layers are configured to provide a temperature-dependent, exchange spring mechanism, a continuous first heat sink layer, and a patterned second heat sink layer in-between the continuous first heat sink layer and the patterned first magnetic layer, wherein the patterned second heat sink layer is a thermally conductive material directly underlying each of the plurality of patterned features.

16. The apparatus of claim 15, wherein the patterned first magnetic layer has a higher anisotropy field $H_k$ than the patterned third magnetic layer, and wherein the patterned third magnetic layer has a higher $H_k$ than the patterned second magnetic layer.

17. The apparatus of claim 15, wherein each of the patterned first and third magnetic layers has a lower saturation magnetization $M_s$ than the patterned second magnetic layer.

18. The apparatus of claim 15, wherein each of the patterned first and third magnetic layers has a lower Curie temperature $T_c$ than the patterned second magnetic layer.

19. The apparatus of claim 15, wherein the continuous first heat sink layer has a higher thermal conductivity than the patterned second heat sink layer.

* * * * *